US006955474B2

(12) United States Patent
Barbiero et al.

(10) Patent No.: US 6,955,474 B2
(45) Date of Patent: Oct. 18, 2005

(54) MOUNTING OF THE BEARING UNIT FOR A WHEEL HUB IN A SUSPENSION SYSTEM OF A MOTOR VEHICLE

(75) Inventors: Davide Barbiero, Moncalieri (IT); Michele Clemente, Airasca (IT)

(73) Assignee: Sistemi Sospensioni S.p.A., Corbetta (IT)

( * ) Notice: Subject to any disclaimer, the term of this patent is extended or adjusted under 35 U.S.C. 154(b) by 65 days.

(21) Appl. No.: 10/481,323

(22) PCT Filed: Jun. 17, 2002

(86) PCT No.: PCT/IB02/02249

§ 371 (c)(1), (2), (4) Date: Dec. 22, 2003

(87) PCT Pub. No.: WO03/000508

PCT Pub. Date: Jan. 3, 2003

(65) Prior Publication Data

US 2004/0165803 A1 Aug. 26, 2004

(30) Foreign Application Priority Data

Jun. 22, 2001 (IT) ..................................... TO2001A0604

(51) Int. Cl.[7] ................................................ F16C 19/08

(52) U.S. Cl. ..................... 384/450; 384/537; 29/898.07

(58) Field of Search ................................ 384/450, 537, 384/544, 516; 29/898.07

(56) References Cited

U.S. PATENT DOCUMENTS 6,135,641 A 10/2000 Smith
6,227,624 B1 5/2001 Wiacek et al.

FOREIGN PATENT DOCUMENTS

EP 0 854 303 A 7/1998

*Primary Examiner*—Lenard A. Footland
(74) *Attorney, Agent, or Firm*—Sughrue Mion, PLLC

(57) ABSTRACT

The outer ring (3) of a motor-vehicle wheel-hub bearing (1) is housed in a cylindrical seat (9) of a strut (10) and is locked axially, on one side of the strut (10), by means of a radially inwardly-projecting rim (18) formed by cold deformation of a tubular portion (17) of the seat (9) and, on the other side, by means of a shoulder (11). A resiliently compressible ring (19) is inserted into the seat (9) of the strut (10) so as to be compressed axially between a lateral surface (12, 13) of the outer ring (3) of the bearing and the shoulder (11) or the deformed rim (18) of the seat (9), respectively, to compensate for any relative thermal expansion between the bearing and the seat.

3 Claims, 4 Drawing Sheets

MOUNTING OF THE BEARING UNIT FOR A WHEEL HUB IN A SUSPENSION SYSTEM OF A MOTOR VEHICLE

This is a National Stage Entry of Application No. PCT/IB02/02249 filed Jun. 17, 2002; the disclosure of which is incorporated herein by reference.

BACKGROUND OF THE INVENTION

The present invention relates to the mounting of a motor-vehicle wheel-hub bearing.

Known examples of the mounting of a motor-vehicle wheel-hub bearing are shown in FIGS. 2, 3 and 4 of the appended drawings. With reference to these drawings, a bearing, generally indicated 1, comprises a radially inner ring 2 and a radially outer ring 3 which have two races for respective sets of balls 4. The inner ring 2 is mounted on a hub 5 provided with a flange 6, to which a disc of the brake 7 (shown in FIGS. 3 and 4) and a wheel 20 of the motor-vehicle (shown partially in FIG. 4) are connected rigidly in known manner.

The outer ring 3, which has an outer cylindrical surface 8, is force-fitted with radial interference in a cylindrical seat 9 provided in a suspension strut 10. The ring is locked axially, in one direction, by abutment against a shoulder 11 formed in the strut 10 and, in the other direction, by a mechanical retaining system.

In the embodiment of FIG. 2, the bearing 1 is inserted in the cylindrical seat 9 from the outside (that is, from the side of the strut facing towards the wheel) until an axially inner lateral surface 12 of the outer ring 3 is brought into abutment against the shoulder 11. The ring 3 is locked axially in the opposite direction (that is, towards the outside), in this case, by the abutment of an axially outer lateral surface 13 thereof against a cover 14 screwed to the strut 10.

In the mounting of FIG. 3, on the other hand, the bearing 1 is inserted in the cylindrical seat 9 from the inside (that is, from the side of the strut facing the chassis of the vehicle) until the axially outer lateral surface 13 of the outer ring 3 is brought into abutment against the shoulder 11 which, in this case, is formed at the level of the outer surface of the strut 10. The ring 3 is locked axially in the opposite direction (that is, towards the inside) in this case by the abutment of its axially inner lateral surface 12 against a snap ring 15 inserted into a groove 16 formed in the cylindrical seat 9 of the strut 10.

These conventional solutions have a series of disadvantages such as:

- large axial size which leads to an excessive offset both of the brake disc and of the wheel, thus penalizing their operation,
- a high mounting cost due both to a larger amount of material of the strut as well as the presence of the above-mentioned mechanical retaining systems (the snap ring and its seat in one case, and the cover and its fixing members in the other case), and to the greater cost of performing the mounting operation,
- the impossibility to control the axial preloading of the bearing and hence to optimize its fatigue life since, for reasons of mounting tolerance, the outer ring 3 is necessarily inserted between the two axial abutment surfaces (the shoulder 11 on one side, and the cover 14 or the snap ring 15 on the other) with play, and
- the possibility of axial movements of the bearing, precisely because of the mounting with axial play, which movements produce an annoying noise (a so-called clicking noise).

A further known example of the mounting of a motor-vehicle wheel-hub bearing is provided by French patent application FR-2 800 234 from which FIG. 4 of the appended drawings is taken. According to the teaching proposed in this patent application, the outer ring 3 of the bearing is locked, on the axially inner side, against the shoulder 11 of the cylindrical seat 9 of the strut 10 and, on the axially outer side, against a radially inner rim 18 formed by cold plastic deformation.

However, this further solution has the disadvantage that it cannot oppose any relative movements between the outer ring of the bearing and its seat in the strut caused by the different thermal expansions of the bearing and of the seat when the strut is made of light alloy.

SUMMARY OF THE INVENTION

The object of the present invention is to provide a mounting of a motor-vehicle wheel-hub bearing which permits to overcome the above-discussed disadvantages of the prior art.

BRIEF DESCRIPTION OF THE DRAWINGS

The characteristics and the advantages of the present invention will become clear from the following detailed description of a preferred embodiment thereof, given purely by way of non-limiting example with reference to the appended drawings, in which.

DETAILED DESCRIPTION OF THE INVENTION

Figure 1:
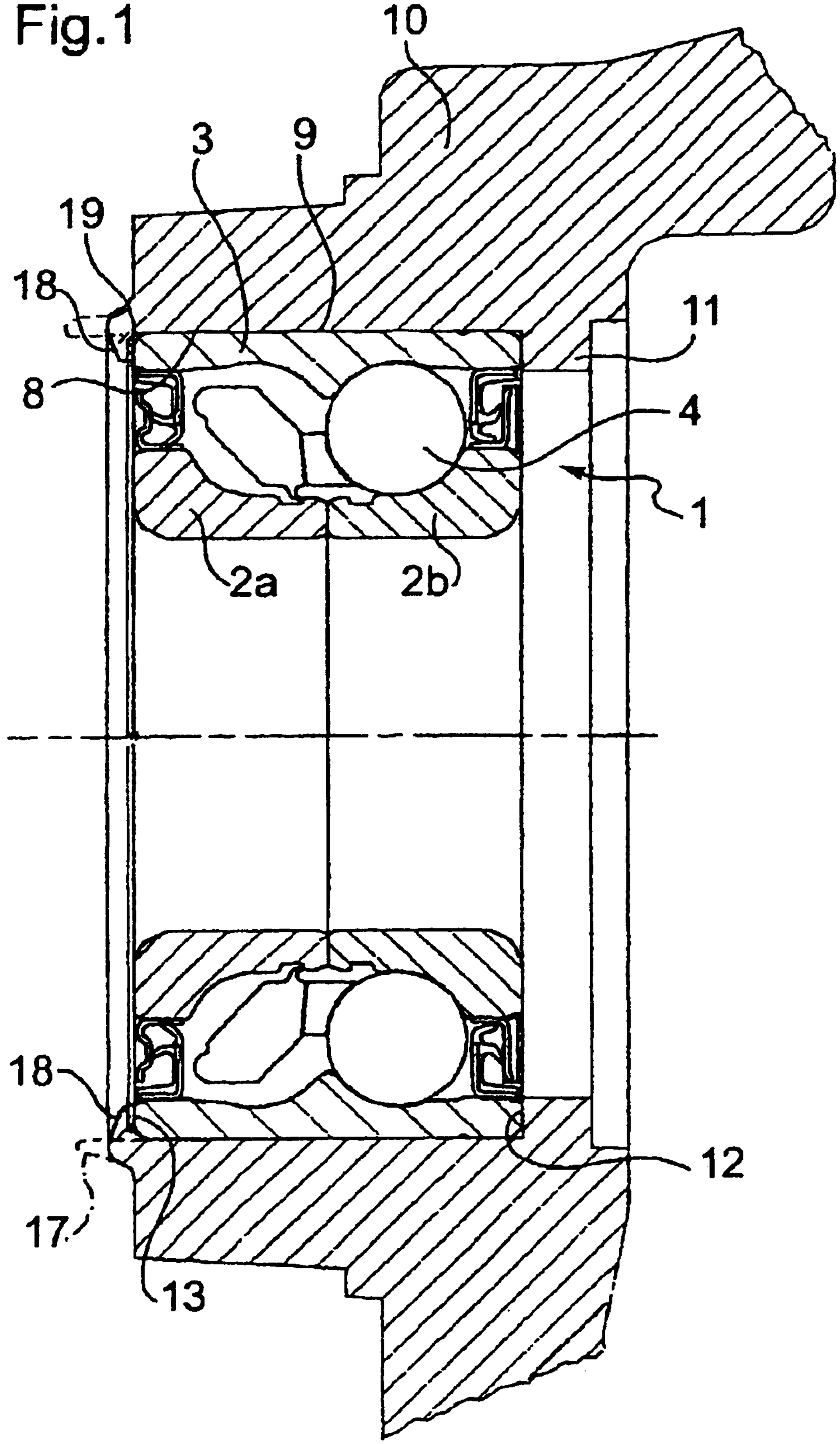
FIG. 1 is a vertical, axial cross-section view of an example of the mounting of a motor-vehicle wheel-hub bearing according to the present invention.
Figure 2:
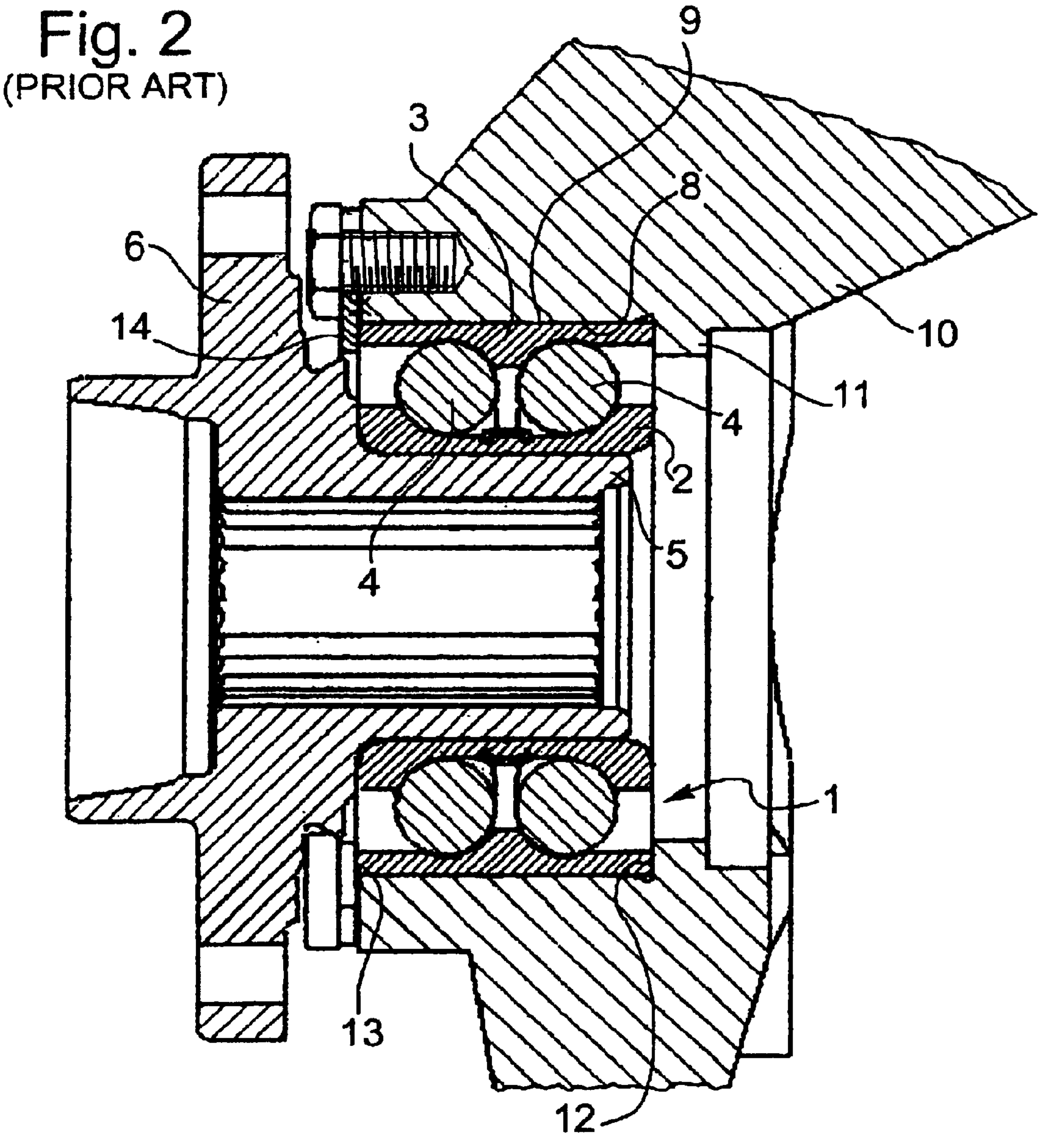
FIGS. 2 to 4 are vertical, axial cross-section views of respective examples of the mounting of a motor-vehicle wheel-hub bearing according to the prior art.
Figure 3:
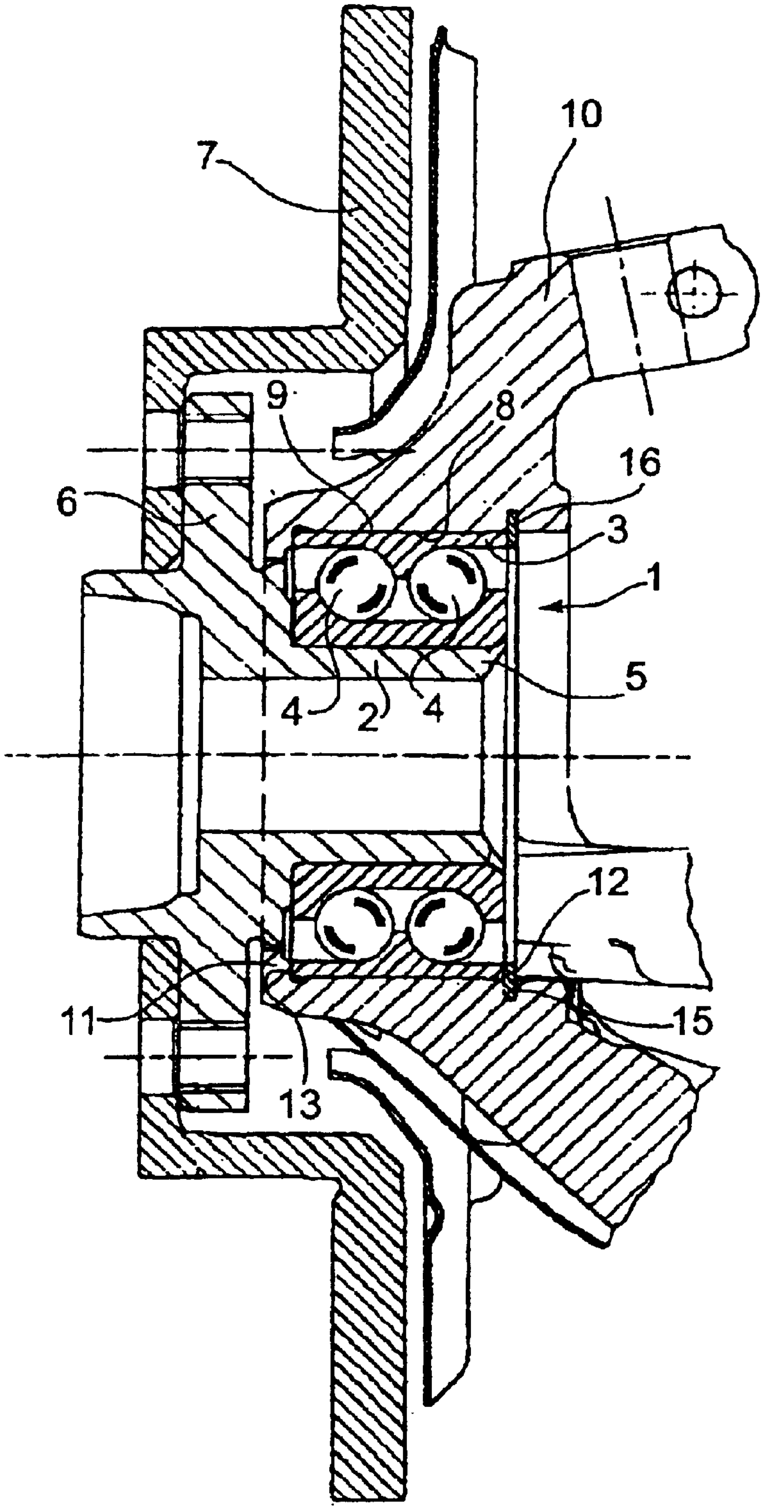
Figure 4:
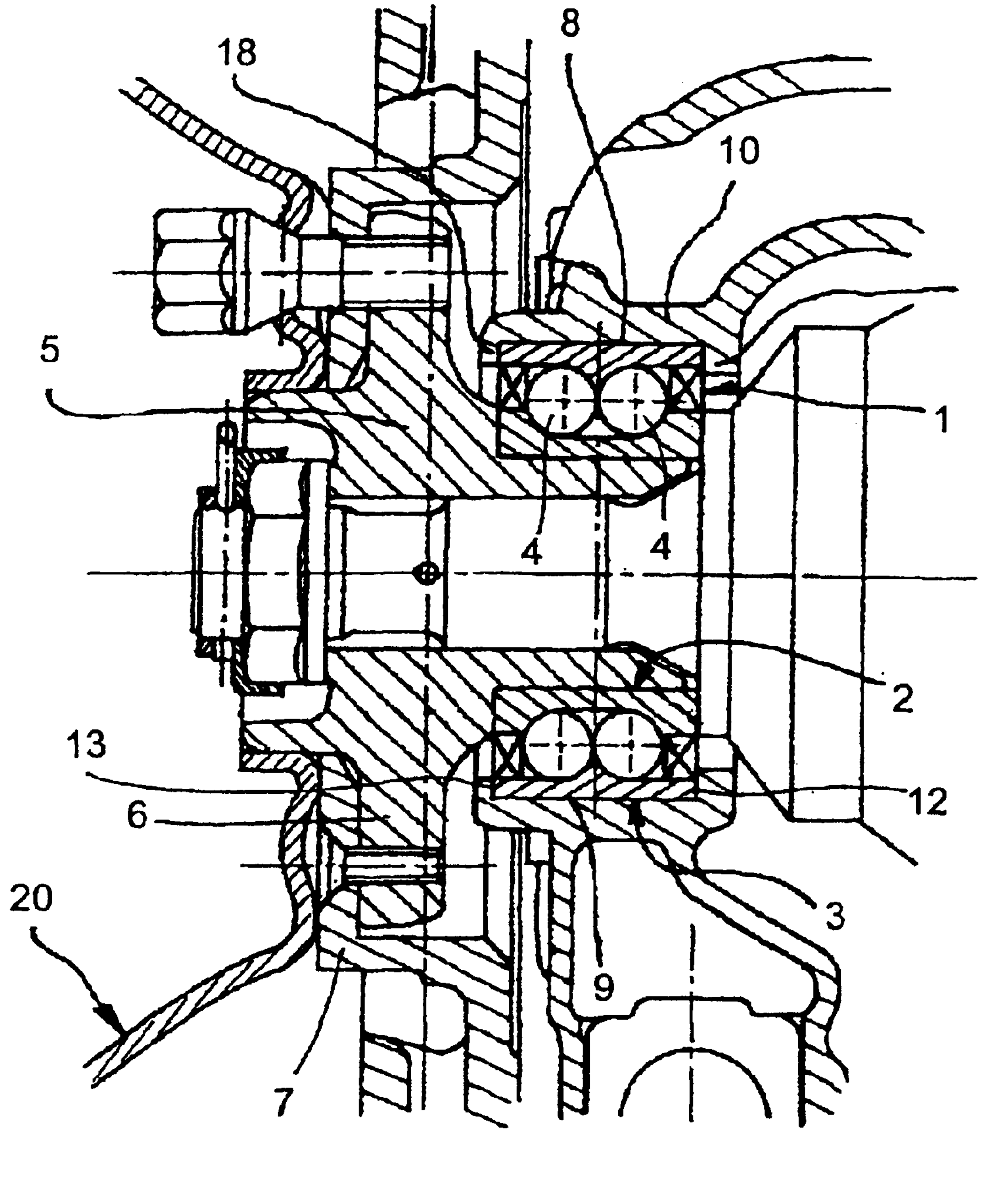

With reference to FIG. 1, in which parts and elements identical or similar to those shown in FIGS. 2 to 4 (prior art) have been attributed the same reference numerals, a conventional wheel-hub bearing 1 for a motor-vehicle (not shown) comprises a radially outer ring 3 with two races for respective sets of rolling elements 4 which, in this example, are balls, and a pair of radially inner rings **2*a* and 2*b*** in each of which a respective race is formed.

The outer ring 3 of the bearing has an outer cylindrical surface 8 which runs over the entire axial dimension of the ring and can be force-fitted with interference into a cylindrical seat 9 formed in a strut 10 of a suspension (of which only the end portion facing the wheel is shown).

The cylindrical seat 9 is delimited axially towards the inside by a shoulder 11 against which an axially inner lateral surface 12 of the outer ring 3 of the bearing (that is, a surface facing towards the chassis of the motor vehicle) is brought into abutment. Moreover, the seat has an axial dimension greater than that of the outer cylindrical surface 8 of the bearing 1 and has a tubular end portion 17 (shown in broken line in FIG. 1) which extends axially outwards. After the force-fitting of the bearing in the seat 9, this tubular portion 17 is folded and upset radially inwards against an axially outer lateral surface 13 of the outer ring 3 by a cold plastic deformation operation, preferably by rolling. A rolled rim 18 is thus obtained, which locks the bearing axially in its seat.

In order to compensate for the relative movements between the outer ring 3 of the bearing and the cylindrical seat 9 in the strut due to the effect of different thermal expansions, for example, when the strut is made of aluminium, according to the invention a suitably shaped ring 19 of resilient material is inserted into the seat 9 so as to be compressed axially between one of the two lateral surfaces 12 or 13 of the outer ring 3 and the respective abutment surface provided by the shoulder 11 or by the rolled rim 18. In the embodiment of FIG. 1, the ring 19 is inserted between the axially outer lateral surface 13 of the ring 3 of the bearing and the rolled rim 18.

The sequence of the mounting operations of the bearing 1 on the strut 10 provides, first of all, that the bearing, complete with outer ring, inner ring and rolling elements, is inserted by forcing of the outer ring 2 into the cylindrical seat 9 of the strut with predetermined radial interference until its inner lateral surface 12 is brought into abutment against the shoulder 11.

The axial dimension of the cylindrical seat 9 in the strut is predetermined in a manner such that, when the outer ring 3 of the bearing is in abutment against the shoulder 11, the end of the tubular portion 17 of the seat, in the undeformed condition prior to rolling, projects a certain distance beyond the outer lateral surface 13 of the outer ring of the bearing to permit the forming of the rolled rim 18 and hence the axial locking of the bearing in the strut.

In order to improve the locking of the bearing in the strut and, in particular, to oppose any relative movements between the outer ring 3 of the bearing and the seat 9 in the strut as a result of the different thermal expansion of the two above-mentioned elements, the ring 19 of resilient material is also inserted into the seat 9. This ring may be inserted either against the shoulder 11, before the introduction of the bearing into the seat 9, or against the outer lateral surface 13 of the outer ring 3 of the bearing, after the introduction of the bearing.

The subsequent rolling operation provides for folding and upsetting of the outer tubular portion 17 of the cylindrical seat 9 in the strut to form the rim 18 which extends radially inwards and preferably runs around the entire circumference of the seat. The rolling is advantageously performed with control of the force applied, imparting to the outer ring of the bearing an axial preloading having the desired value, which is set in a manner such as to optimize the fatigue life of the bearing.

As a result of the rolling, the ring 19 is thus compressed axially between the outer lateral surface 13 of the bearing and the rolled rim 18 or between the inner lateral surface 12 of the bearing and the shoulder 11. The play between the outer ring 3 of the bearing and the seat 9 resulting from relative thermal expansion is thus compensated for and also the control of the axial preloading of the outer ring of the bearing is further improved.

In the light of the foregoing description, it is clear that the mounting of a motor-vehicle wheel bearing according to the invention offers the advantages of:

- restricting the axial dimensions of the wheel side of the strut with consequent benefits in terms of weight and cost since it enables the offset of the brake disc and of the wheel to be reduced,
- controlling the axial preloading of the outer ring of the bearing and hence increasing the fatigue life of the bearing, and
- resisting the play resulting from relative thermal expansion between the outer ring of the bearing and its seat, when the seat is made of light alloy.

Naturally, the principle of the invention remaining the same, the forms of embodiment may be varied widely with respect to those described and illustrated purely by way of non-limiting example, without thereby departing from the scope of the invention as defined in the appended claims.

In particular, although the description and the drawings illustrate the mounting of the bearing in a seat formed in the strut, the invention is intended also to relate to the case in which the seat is formed in the wheel hub.

What is claimed is:

1. A method of mounting a motor-vehicle wheel-hub bearing, of the type comprising the steps of:

(a) providing a bearing (1) having a radially outer ring (3) with an outer cylindrical surface (8), a first lateral surface (12), and a second lateral surface (13) at the end axially remote from the first, (b) providing an axial cylindrical seat (9) which runs between a tubular portion (17) and a shoulder (11) and has an axial length greater than that of the outer cylindrical surface (8) of the ring (3) of the bearing (1), (c) force-fitting the outer cylindrical surface (8) of the bearing (1) in the cylindrical seat (9) with radial interference until the first lateral surface (12) of the outer ring (3) is brought into axial abutment against the shoulder (11) so as to leave the tubular portion (17) of the seat (9) projecting beyond the second lateral surface (13) of the ring (3), and (d) cold-deforming the tubular portion (17) of the cylindrical seat (9) radially inwardly towards the second lateral surface (13) of the outer ring (3) of the bearing (1) so as to form a deformed rim (18) for locking the bearing (1) axially in the seat (9), characterized in that the cold-deformation step (d) is preceded by the step of:

(c') inserting, into the cylindrical seat (9), in a position axially adjacent the outer ring (3) of the bearing (1), a ring (19) which can be compressed resiliently in an axial direction, so that, after step (d), the ring (19) is compressed axially between one of the two lateral surfaces (12, 13) of the outer ring (3) of the bearing (1) and the shoulder (11) or the deformed rim (18) of the seat (9), respectively, in order to compensate for any relative thermal expansion between the bearing and the seat.

2. A method according to claim 1, characterized in that the cold-deformation step (d) is performed with control of the deformation force so as to apply an axial preloading of predetermined value to the outer ring (3) of the bearing (1).

3. A bearing unit for a motor-vehicle wheel, in which a bearing (1) with a radially outer ring (3) having a first lateral surface (12) and a second lateral surface (13) axially remote from the first is housed in a cylindrical seat (9), the outer ring (3) of the bearing (1) being locked axially in the seat (9) with the first lateral surface (12) in abutment against a shoulder (11) and with the second lateral surface (13) in abutment against a radially inner rim (18) of the seat (9) formed by cold deformation, characterized in that a ring (19) which can be compressed resiliently in an axial direction is inserted into the cylindrical seat (9) so as to be compressed axially between one of the lateral surfaces (12, 13) of the outer ring (3) of the bearing (1) and the shoulder (11) or the deformed rim (18) of the seat (9), respectively, to compensate for any relative thermal expansion between the bearing and the seat.

* * * * *